(12) United States Patent
Oldani

(10) Patent No.: US 8,151,854 B2
(45) Date of Patent: Apr. 10, 2012

(54) FIBER PLACEMENT MACHINE PLATFORM SYSTEM HAVING INTERCHANGEABLE HEAD AND CREEL ASSEMBLIES

(75) Inventor: Tino Oldani, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 773 days.

(21) Appl. No.: 12/252,463

(22) Filed: Oct. 16, 2008

(65) Prior Publication Data

US 2009/0095410 A1 Apr. 16, 2009

Related U.S. Application Data

(60) Provisional application No. 60/980,221, filed on Oct. 16, 2007.

(51) Int. Cl.
*B65H 81/00* (2006.01)
(52) U.S. Cl. ......... 156/433; 156/441; 156/523; 156/573
(58) Field of Classification Search .............. 156/173, 156/175, 433, 441, 523, 573, 425
See application file for complete search history.

(56) References Cited

U.S. PATENT DOCUMENTS

| | | | |
|---|---|---|---|
| 4,699,683 A * | 10/1987 | McCowin | 156/353 |
| 5,110,395 A | 5/1992 | Vaniglia | |
| 5,397,523 A | 3/1995 | Curry | |
| 2003/0171447 A1* | 9/2003 | Torres Martinez | 522/75 |
| 2005/0236735 A1 | 10/2005 | Oldani et al. | |
| 2005/0247396 A1* | 11/2005 | Oldani et al. | 156/173 |
| 2006/0180264 A1* | 8/2006 | Kisch et al. | 156/173 |
| 2007/0044919 A1 | 3/2007 | Hoffmann | |
| 2007/0187021 A1 | 8/2007 | Oldani et al. | |

OTHER PUBLICATIONS

Russell Devlieg, et al.; High-Speed Fiber Placement on Large Complex Structures; publication; 2007; 5 pages, pp. 1-5; 2007-01-3842; Electroimpact, Inc.

* cited by examiner

*Primary Examiner* — Jeff Aftergut
(74) *Attorney, Agent, or Firm* — Reinhart Boerner Van Deuren P.C.

(57) ABSTRACT

A modular fiber placement machine head assembly and refrigerated creel assembly affixed to a cradle for an interchangeable platform system adapted for composite fiber manufacturing through an automated, computer controlled, fiber placement machine is described.

16 Claims, 5 Drawing Sheets

FIBER PLACEMENT MACHINE PLATFORM SYSTEM HAVING INTERCHANGEABLE HEAD AND CREEL ASSEMBLIES

CROSS-REFERENCE TO RELATED PATENT APPLICATION

This patent application claims the benefit of U.S. Provisional Patent Application No. 60/980,221, filed Oct. 16, 2007, the entire teachings and disclosure of which are incorporated herein by reference thereto.

FIELD OF THE INVENTION

This invention relates to the forming of composite structures with automated fiber placement machines, and more particularly to fiber placement machine heads and articulated support structures with creels for storage of spools of tows of material for use in forming the composite structures with multiple fiber tow placement requirements.

BACKGROUND OF THE INVENTION

Automated fiber placement machines are widely used to manufacture parts, components and structures from composite material. The materials used in automated fiber placement are typically composed of longitudinal fibers and resin consolidated into tapes or thin strips commonly known as "tows." The individual tapes or tows are manipulated by the fiber placement machine to form a band of material that is deposited onto a mold or tool. Parts are built up layer-by-layer, with tapes or tows of composite material, with the angle at which each layer or "ply" is laid onto the tool being precisely determined by the fiber placement machine.

Automated fiber placement enables the construction of complex composite structures having steered or curvilinear fiber paths. This method of producing composite structures is more cost effective than manual methods. It provides an improved structural efficiency due to its ability to orient the fibers along local internal loads paths, which potentially results in lighter structures and lower cost than in structures made by other production methods.

The tool that the composite material is laid onto is often quite complex, in that the geometry of the finished part is machined into the tool surface. Depending upon the desired result, the tool may have the form of the outside "Outer Mold Line—OML" or the inside "Inside Mold Line—IML".

The individual tows of material are typically wound onto spools, stored in an environmentally-controlled structure known as a creel. A single creel may commonly include for example, provisions for storage and simultaneous out-feed from 32 spools. During the fiber placement process, particularly on large parts, the tows stored on one or more of the spools may be completely used up, prior to the completion of the part.

In order to reduce the time and cost required for forming large or complex structures, such as those manufactured in the aerospace or aircraft industries, it is desirable to utilize multiple automated fiber placement machines. In order to efficiently and safely utilize multiple automated fiber placement machines for the effective laying of fibers onto a common tool surface, it is necessary that an apparatus and method for simultaneously controlling multiple fiber placement machines be provided. Consistent with this desire is the ability to manufacture particularly large pieces with a minimum of lost or "down time" spent on replenishing composite fiber creels for application. It would be desirable to have an apparatus and method that would allow for composite fiber application and simultaneous creel replenishment.

In order to accomplish the fabrication of either large or complex parts, it is also desirable that a method and apparatus be provided for replenishing the supplies of composite materials available to the automatic fiber placement machines without interrupting the fiber placement process by shutting down all of the machines, when any one of the fiber placement heads needs to have its supply of composite materials replenished. In similar fashion it is desirable to have the capability of changing-out the fiber placement heads of the fiber placement machines, without interruption of the fiber placement process so that the heads may be periodically serviced and cleaned to maintain optimal operating speeds of the fiber placement process.

It is desirable, therefore, to provide a method and/or apparatus for replenishing the exhausted spool as quickly and efficiently as possible, so as to minimize interruption of the fiber placement process. As identified in U.S. Provisional Patent Application No. 60/564,154, filed Apr. 21, 2004, now U.S. Non-Provisional application Ser. No. 11/111,499, filed Apr. 21, 2005, it is also highly desirable to provide a method and/or apparatus for replacing either an entire creel assembly and inventory in order to provide an efficient, uniform supply of the required creels in the correct tow widths, while having the exhausted creel assembly either replenished with more of the same required supply, or; replaced with alternative or different dimensioned tow supplies for alternative or different applications.

Further, as identified in U. S. Provisional Patent Application No. 60/711,290, filed Aug. 25, 2005, now U.S. Non-Provisional application Ser. No. 11/510,165, filed Aug. 25, 2006, it is also desirable that both the fiber placement head and support structure for the fiber placement head be a compact, rugged, simple construction that allows maximum access for threading the multiple tows of fiber through the support structure and placement head onto either a large, or small complex or curvilinear mold line being presented on either a rotating mandrel or stationary tablet.

It is also highly desirable to have a system of fiber placement machines that can accommodate a complex design of composite fiber placement involving multiple applications of multiple width tows and multiple width compaction rollers in an efficient mode of interchangeability.

BRIEF SUMMARY OF THE INVENTION

In one form of the invention, an automated fiber placement machine mounted on a modular cradle being interchangeable with other similarly configured cradles for utilization within either a host gantry or ram platform system is provided in an embodiment.

An automated fiber placement machine having a compact fiber placement head and roller apparatus; and a multi-axial articulated wrist apparatus; and an internal power source that maneuvers an internal fiber redirect mechanism; and a plurality of fiber tows mounted on spools, all of which are contained within a refrigerated creel assembly is provided in an embodiment.

An automated fiber placement machine mounted on a modular cradle with a fixed constant distance maintained between the fiber placement head and the creel assembly and having at least one fiber tow redirect mechanism between the fiber placement head and the creel assembly is provided in an embodiment. It another embodiment, the fixed constant distance is not required, and instead a cradle that incorporates either a fixed constant relationship between the fiber placement head and the creel assembly, or one that allows for the extension or retention of the fiber placement head on the same axis as the creel assembly is used.

A method and process of an automated fiber placement machine mounted on modular cradle being interchangeable with other similarly configured cradles for utilization within either a host gantry or ram platform system in either a vertical or horizontal axes application is provided in an embodiment.

An automated fiber placement machine mounted on a modular cradle being interchangeable with other similarly configured cradles for utilization within either a host gantry or ram platform system and each cradle having either an interchangeable fiber placement head or interchangeable creel assembly or both is provided in an embodiment.

An automated fiber placement machine mounted on a modular cradle being interchangeable with other similarly configured cradles for utilization within either a host gantry or ram platform system and each cradle having either an interchangeable fiber placement head or interchangeable creel assembly or both and being operable within parameters or commands provided by a computer aided design software program is provided in an embodiment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
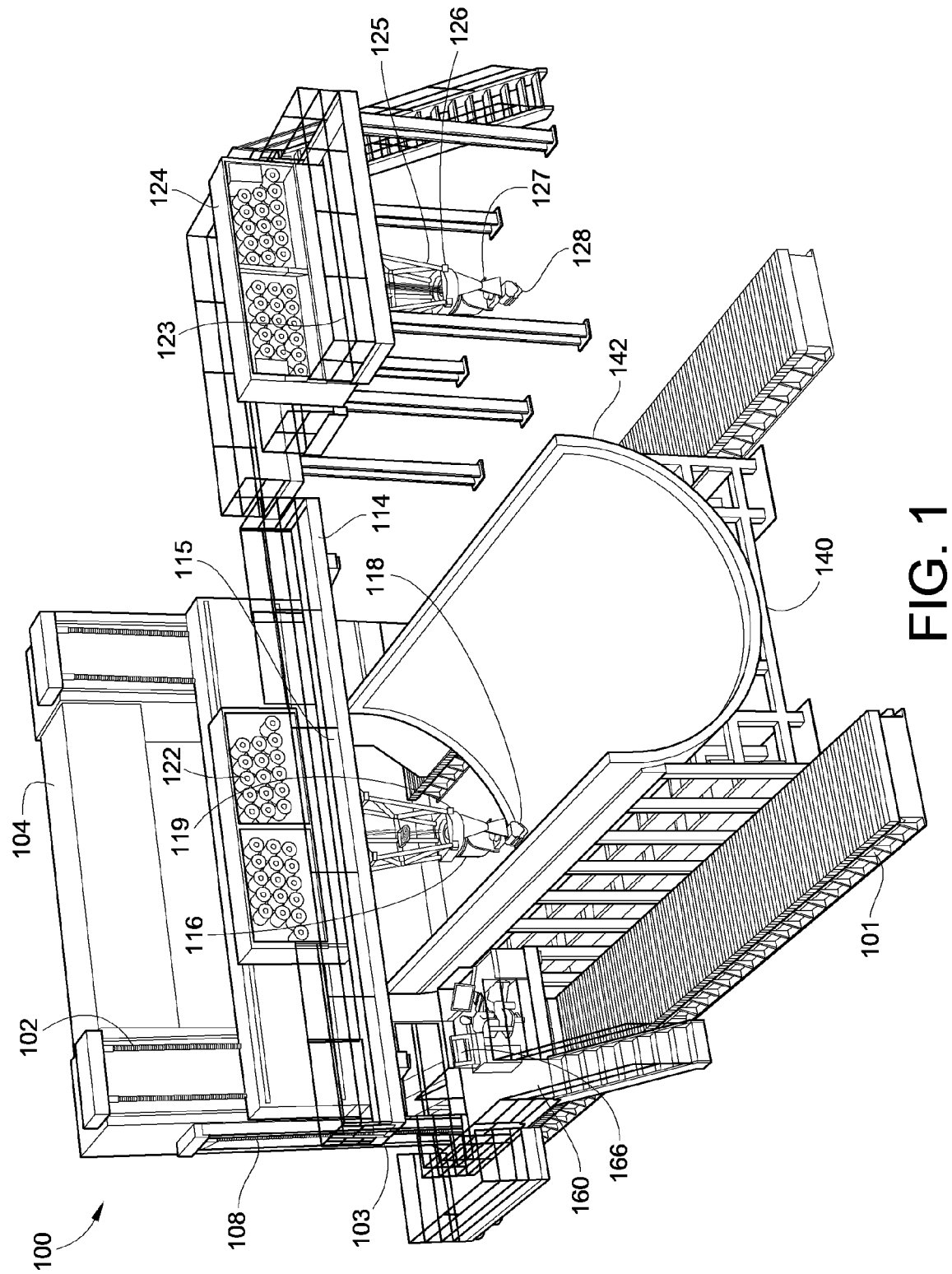
FIGS. 1 and 1A depict an embodiment of the invention utilized in a vertical axis application in relation to a stationary tablet mold or a rotating mandrel as manipulated by a reciprocating headstock and tailstock apparatus.
Figure 1A:
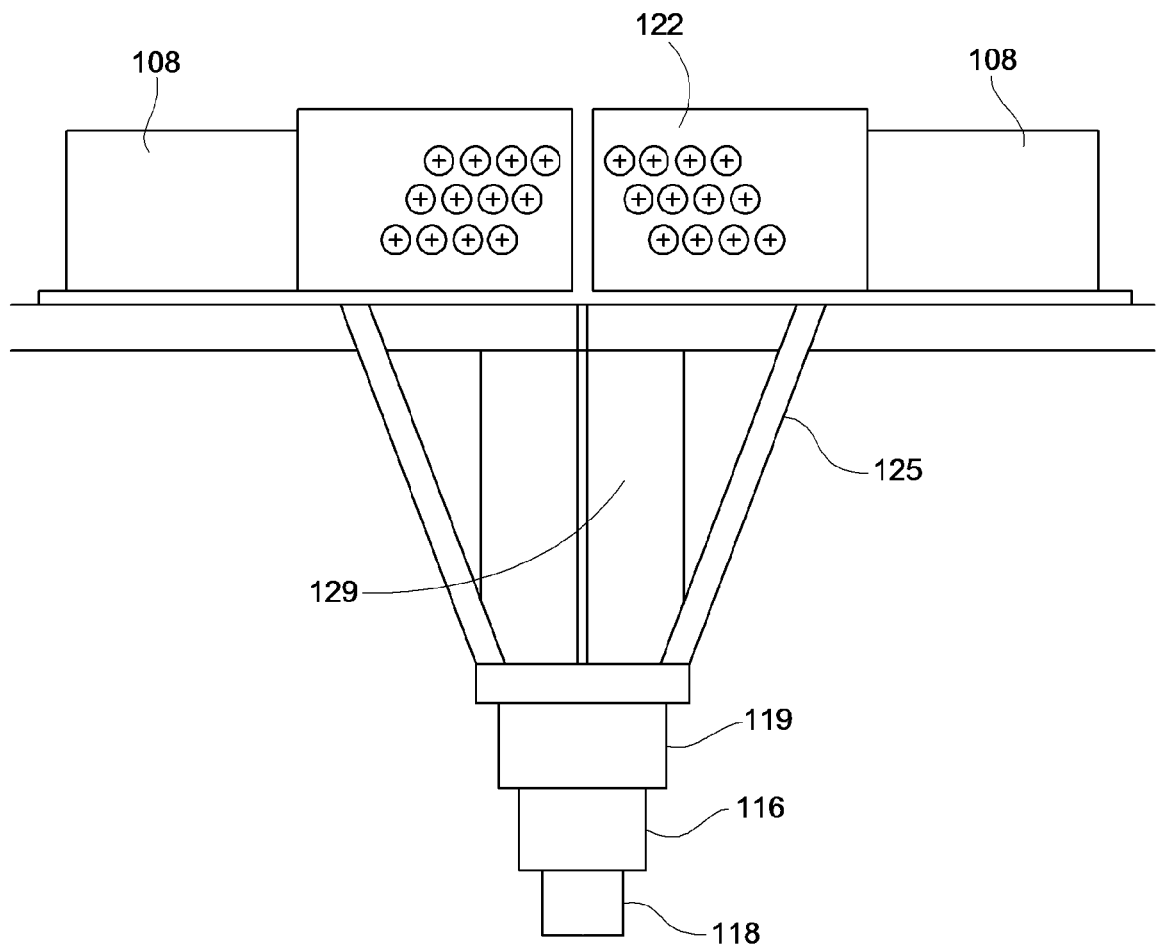

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In an embodiment of the invention, a fiber placement machine 100, which includes a compact fiber placement head 118 and a support structure 125 therefor, having one or more internal motors 119 for positioning the fiber placement head 118 is used. The internal motors 119 may be constructed with a hollow core for passage therethrough of multiple tows 123 of material. Use of internal motors 119 in accordance with the invention, allows the manipulation of the pivot axis mechanism 116 of the multi-axial fiber placement head 118 and support structures 125 therefor to be smaller than prior heads and support structures in which the head 118 was positioned by motors driving through mechanical drive trains, having gears, pulleys, chains, etc. Use of the internal motor driven redirect mechanism also provides for significantly faster positioning and repositioning of the fiber placement head 118, than was achievable with prior drive arrangements.

Further, as shown in FIG. 1, the fiber replacement machine 100 embodies a frame 104 positioned on a first horizontal axis and mechanism 101 for positioning the bridge 108 which carries the platform 114 containing the cradle assembly 115 and the refrigerated creel assembly 122. The entire refrigerated creel assembly 122 is presented on this embodiment for utilization along a first vertical axis 102 for the purposes of elevation or descent in relation to the mold 142 presented on the stationary tablet 140. In conjunction with elevating or descending as directed by the computer integrated operating system 166 presented on the operator station 160, the platform 114 and creel assembly 115 moves along a second horizontal axis 103.

As shown, a second cradle 123 bearing a replacement refrigerated creel assembly 124 and support structure 125 bearing an internal motor 126 and driven pivot assembly 127 with fiber redirect mechanism and multi-axial fiber placement head 128, for the application of composite fiber tows 129, is identical in its design configuration so that it may be exchanged with the platform 114 and cradle assembly 115 at a point determined by the volume of fiber tow expended or exhausted in compliance with the computer integrated operating system 166 in the manufacture of the product design. The machine operator may at the appropriate point exchange the operating platform 114 and cradle assembly 115 and replace those with the supplemental replacement creel assembly 124 bearing composite tows of same or different dimensions or composition as required by the computer operating system 166 in compliance with a computer aided design. The replacement cradle 123 and creel assembly 124 may also be presented with a replacement multi-axial fiber placement head 128 of either larger or smaller dimensions that those of the presently operating fiber placement head 118. In one embodiment, the replacement cradle 123 and creel assembly 124 exchange between an exhausted cradle 123 and creel assembly 124 and a fully replenished cradle 123 and creel assembly 124 may be accomplished through a programmable event in the automated fiber placement computer software program.

Figure 2:
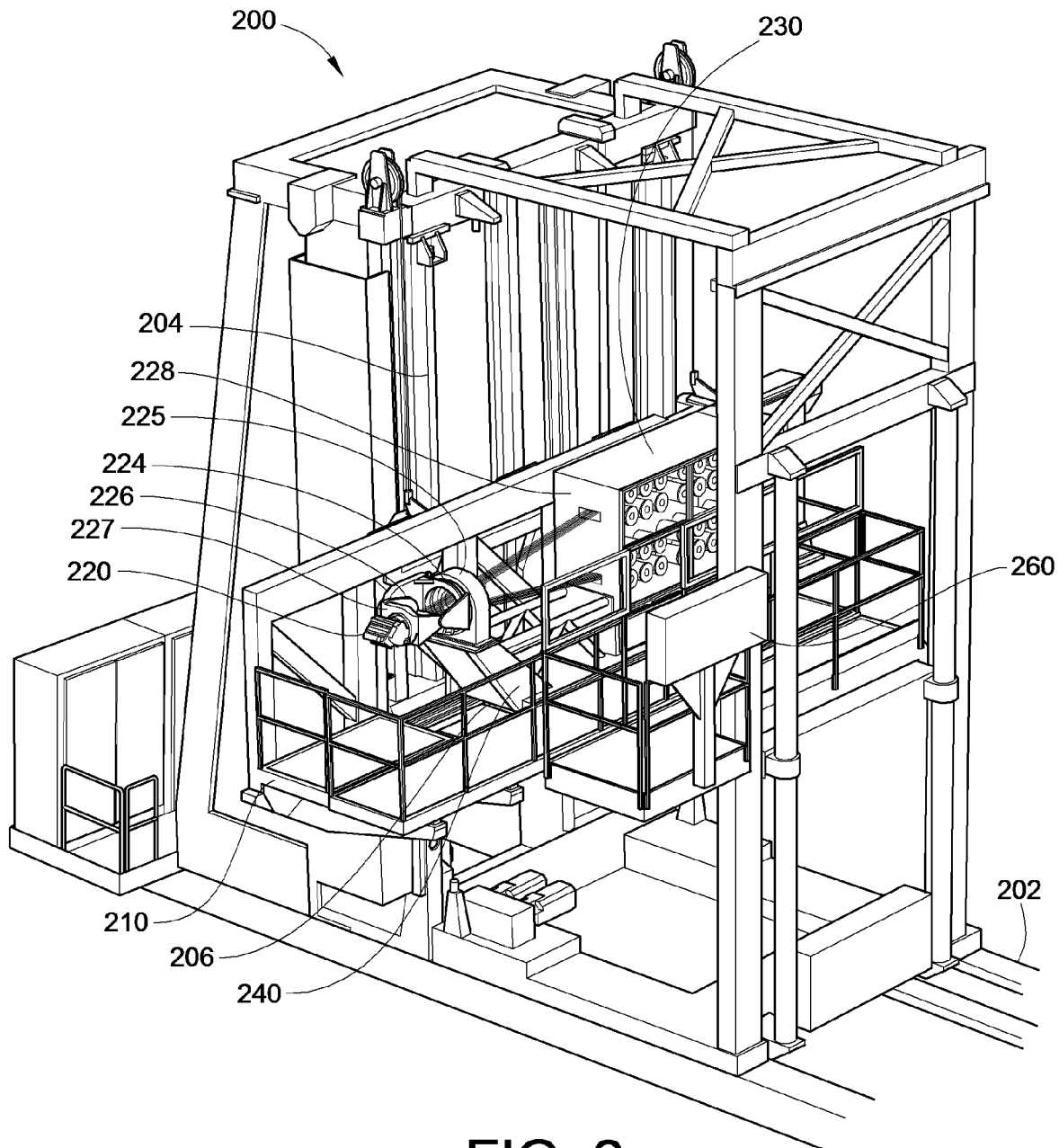
FIG. 2 displays the interchangeable platform in use in a system on a horizontal axis application that may be utilized with either a mandrel that embodies a method of manipulation and/or rotation through a reciprocating head and tailstock apparatus or a stationary tablet mold in accordance with the teachings of the present invention.

Another form of an embodiment of the invention is displayed in FIG. 2 wherein a fiber placement machine 200 having a first horizontal axis path mechanism 202 presents the platform 206 for either elevation or descent on the first vertical axis 204 as well as movement along a second horizontal axis path 210 in relation to either a stationary tablet holding a mold for fiber tow application, or rotating mandrel operating with a headstock and tailstock mechanisms that operate in a reciprocal mode to the fiber placement head 220 as directed by the computer integrated operating system 260 which responds to the commands and parameters established through a computer aided design software program. The platform 206 holds the refrigerated creel assembly 230 which is presented on the cradle 240 in a fixed relation to the articulated wrist assembly 226 having an internal motor 224 that operates the internal fiber redirect mechanism 225 for presentation of the fiber tows 228 to the compact fiber placement head 220.

The refrigerated creel assembly 230 may be exchanged with another bearing composite fiber tows of larger, smaller widths, or of differing material compositions as required by the computer aided design. Additionally, the compact fiber placement head mechanism 220 may be interchangeable with others of larger or smaller diameters as required by the computer aided design. Further, these platforms bearing alternative or substitute creel assemblies or fiber placement heads may be wholly interchangeable with one another in order to expedite the manufacturing process with minimal down time or loss of productivity.

Figure 3:
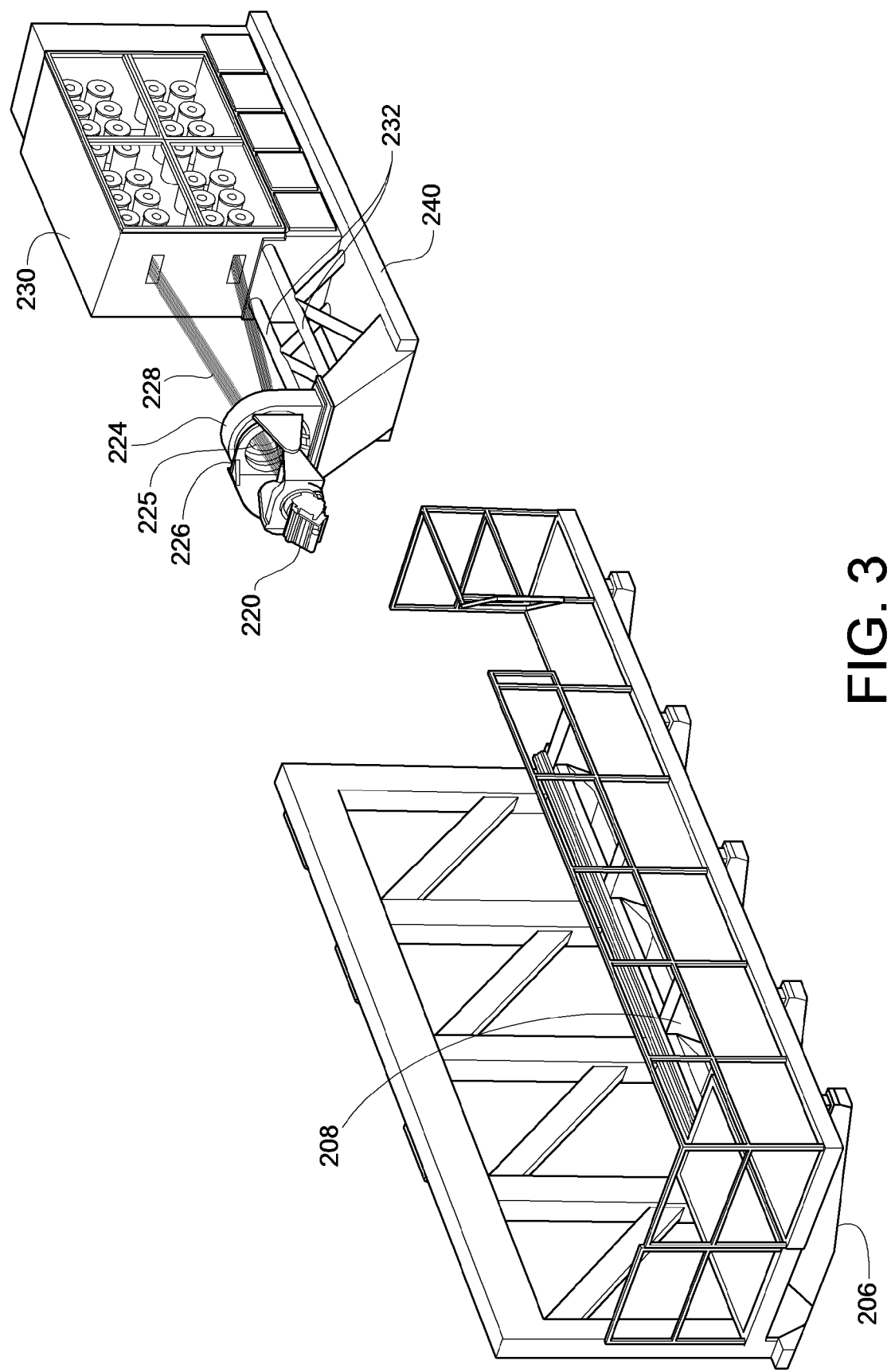
FIG. 3 is a simplified illustration of an embodiment of the invention showing just the interchangeable cradle bearing a compact fiber placement head apparatus with the multi-axial wrist mechanism and the interchangeable creel assembly in fixed relationship apart from the fiber placement machine platform for use with either a mandrel that embodies a method of manipulation and/or rotation through a reciprocating head and tailstock apparatus or a stationary tablet mold as defined further herein.
Figure 4:
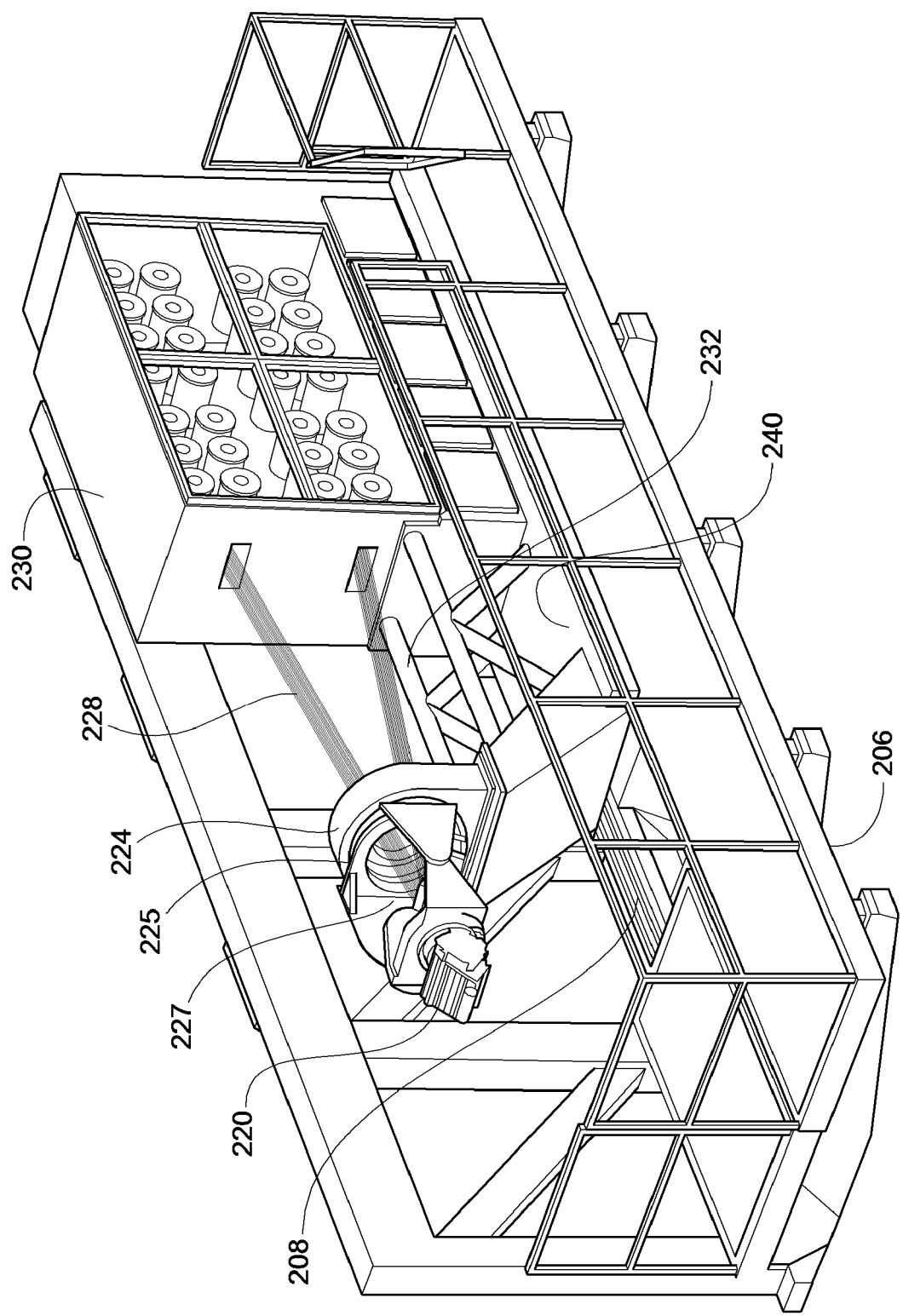
FIG. 4 is a simplified illustration of an embodiment of the present invention displaying the interchangeable platform bearing a compact fiber placement head apparatus and the interchangeable creel assembly in fixed relationship for movement and utilization within the range offered by the platform for use with either a mandrel that embodies a method of manipulation and/or rotation through a reciprocating head and tailstock apparatus or a stationary tablet mold.

As shown in FIG. 3, in an embodiment of the invention when utilized in a horizontal presentation, the cradle 240 is guided onto the platform 206 through the design configuration of the cradle track 208. The cradle 240 is also operated through an internal drive mechanism to maneuver along the second horizontal axis path 210. In an embodiment the cradle 240 presents the refrigerated creel assembly 230 in a manner which accommodates interchangeable refrigerated creel assemblies that do not encumber or affect the position of the articulated wrist assembly 226 or the compact fiber placement head 220. Additionally, the fiber tows 228 are transferred through the internal motor 224 that drives the fiber redirect mechanism 225 and presents the fiber tows 228 to the compact fiber placement head 220. In an embodiment all cradles 240 bearing refrigerated creel assemblies 230 and compact fiber placement heads 220 utilizing the articulated wrist assemblies 226 and internal fiber redirect mechanisms 225 which are driven and/or operated by the internal motor(s) 224 are capable of bearing fiber tows of various thickness or width and/or material composition. They also are capable of bearing compact fiber placement head mechanisms of varying diameters and being wholly interchangeable at the direction of the computer integrated production software as commanded by the computer aided design or at the discretion of the fiber placement machine operator.

Also in an embodiment of the invention, a compact fiber placement machine includes a method for replacing a refrigerated creels, by sequentially moving replacement creels into place on tracks and/or guide rails as one or more spools in a previously operating creel are exhausted and removing the creels having the one or more spools, to thereby allow fiber placement to continue from the replacement creel(s) while the creel(s) having one or more exhausted spools of material is replenished.

In one form of the invention, an interchangeable refrigerated creel assembly apparatus and/or method for replacing creel(s) in a fiber placement machine may also incorporate apparatuses and methods for accomplishing an auto-splice of the fiber tows as the creels are interchanged.

In one form of an embodiment of the invention, an automated fiber placement machine platform with interchangeable cradles may also include replacing one or more of the two or more fiber placement mechanisms during the fabrication of the composite part.

In one form of an embodiment of the invention, each fiber placement machine operating with a platform system that allows multiple interchangeable cradles, each bearing a compact fiber placement head, operating simultaneously, may be controlled each by its own controller. Within such an embodiment a selected controller operates as a master controller and one or more of the remaining controllers operates as slave controllers, operatively connected to the master controller. This synchronizes the simultaneous movements of the fiber placement heads operatively connected to the master and slave controllers as commanded by the computer aided design and executed within the parameters of the computer integrated operating software system.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An automated fiber placement system, comprising:
   a plurality of modular cradles adapted to be interchangeable within a host gantry or platform system; and
   an automated fiber placement machine mounted on the each of the plurality of modular cradles, the automated fiber placement machine including a compact fiber placement head and roller apparatus, a multi-axial articulated wrist apparatus, an internal power source that maneuvers an internal fiber redirect mechanism, a plurality of spools for mounting of fiber tows contained in a refrigerated creel assembly; and
   wherein each of the modular cradles is adapted to maintain a fixed distance between the fiber placement head and the creel assembly and incorporates at least one fiber redirect mechanism between the fiber placement head mechanism and the creel assembly.

2. The automated fiber placement system of claim 1, further comprising a gantry supporting one of the modular cradles, and wherein the automated fiber placement machine is mounted on each of the modular cradles along a vertical axis to allow vertical application of fiber tows to either a fixed tablet or rotating mandrel having an attendant reciprocal headstock and tailstock mechanisms.

3. The automated fiber placement system of claim 1, further comprising a gantry supporting one of the modular cradles, and wherein the automated fiber placement machine is mounted on each of the modular cradles along a horizontal axis to allow horizontal application of fiber tows to either a fixed tablet or rotating mandrel having an attendant reciprocal headstock and tailstock mechanisms.

4. The automated fiber placement system of claim 1, further comprising a plurality of platforms adapted to receive and host the plurality of modular cradles, and wherein each of the plurality of cradles includes an interchangeable creel assembly.

5. The automated fiber placement system of claim 1, further comprising a plurality of platforms adapted to receive and host the plurality of modular cradles, and wherein each of the plurality of cradles includes an interchangeable fiber placement head assembly.

6. The automated fiber placement system of claim 1, further comprising a plurality of platforms adapted to receive and host the plurality of modular cradles, and wherein each of the plurality of cradles includes an interchangeable creel assembly and an interchangeable fiber placement head.

7. The automated fiber placement system of claim 6, wherein the automated fiber placement machine further includes a computer aided design software program, and wherein the interchangeable creel assembly and the interchangeable fiber placement head are operable by commands from, and within parameters provided by, the computer aided design software program.

8. The automated fiber placement system of claim 1, wherein the at least one fiber redirect mechanism between the fiber placement head mechanism and the creel assembly is an internal motor mounted on the modular cradle for positioning the fiber placement head, the internal motor having a hollow core for passage therethrough of the fiber tows from the creel assembly to the fiber placement head.

9. An automated fiber placement system, comprising:
a plurality of modular cradles including a fiber placement machine having a fiber placement head and creel assembly and a multi-axial articulated wrist apparatus mounted thereon;
a gantry system having a platform moveable thereon, the platform being adapted to interchangeably accept and host at least one of the modular cradles at a time; and
a support structure adapted to interchangeably accept and host at least one of the plurality of modular cradles not being hosted by the platform.

10. The automated fiber placement system of claim 9, further comprising:
a fixed tablet onto which fiber tows are to be laid; and
wherein the fiber placement machine is mounted on each of the modular cradles along a vertical axis to allow vertical application of the fiber tows to the fixed tablet.

11. The automated fiber placement system of claim 9, further comprising:
a rotating mandrel onto which fiber tows are to be laid having an attendant reciprocal headstock and tailstock mechanisms; and
wherein the fiber placement machine is mounted on each of the modular cradles along a vertical axis to allow vertical application of the fiber tows to the rotating mandrel.

12. The automated fiber placement system of claim 9, further comprising:
a fixed tablet onto which fiber tows are to be laid; and
wherein the fiber placement machine is mounted on each of the modular cradles along a horizontal axis to allow horizontal application of the fiber tows to the fixed tablet.

13. The automated fiber placement system of claim 9, further comprising:
a rotating mandrel onto which fiber tows are to be laid having an attendant reciprocal headstock and tailstock mechanisms; and
wherein the fiber placement machine is mounted on each of the modular cradles along a horizontal axis to allow horizontal application of the fiber tows to the rotating mandrel.

14. The automated fiber placement system of claim 9, further comprising:
a fixed tablet onto which fiber tows are to be laid; and
wherein one of the fiber placement machines is mounted on one of the modular cradles along a vertical axis to allow vertical application of the fiber tows to the fixed tablet; and
wherein another one of the fiber placement machines is mounted on another one of the modular cradles along a horizontal axis to allow horizontal application of the fiber tows to the fixed tablet.

15. The automated fiber placement system of claim 9, further comprising:
a rotating mandrel onto which fiber tows are to be laid having an attendant reciprocal headstock and tailstock mechanisms; and
wherein one of the fiber placement machines is mounted on one of the modular cradles along a vertical axis to allow vertical application of the fiber tows to the rotating mandrel; and
wherein another one of the fiber placement machines is mounted on another one of the modular cradles along a horizontal axis to allow horizontal application of the fiber tows to the rotating mandrel.

16. The automated fiber placement system of claim 9, wherein each of the modular cradles is adapted to maintain a fixed distance between the fiber placement head and the creel assembly and incorporates at least one fiber redirect mechanism between the fiber placement head mechanism and the creel assembly.

* * * * *